(12) United States Patent
Hsu et al.

(10) Patent No.: US 8,274,006 B2
(45) Date of Patent: Sep. 25, 2012

(54) GAS RELEASABLE KEY STRUCTURE AND KEYBOARD STRUCTURE USING THE SAME

(75) Inventors: Chien-Shih Hsu, Taipei (TW); Hong-Yi Huang, Taipei (TW)

(73) Assignee: Darfon Electronics Corp., Taoyuan (TW)

( * ) Notice: Subject to any disclaimer, the term of this patent is extended or adjusted under 35 U.S.C. 154(b) by 532 days.

(21) Appl. No.: 12/641,553

(22) Filed: Dec. 18, 2009

(65) Prior Publication Data
US 2010/0156678 A1 Jun. 24, 2010

(30) Foreign Application Priority Data
Dec. 24, 2008 (TW) .............................. 97223204 U (51) Int. Cl.
*H01H 1/10* (2006.01)
(52) U.S. Cl. ........................................................ 200/515
(58) Field of Classification Search .................. None
See application file for complete search history.

(56) References Cited

U.S. PATENT DOCUMENTS

| | | | | |
|---|---|---|---|---|
| 4,378,478 | A * | 3/1983 | Deeg | 200/515 |
| 6,222,527 | B1 * | 4/2001 | Hu | 345/168 |
| 6,664,901 | B1 * | 12/2003 | Yamada et al. | 341/22 |
| 7,589,293 | B2 * | 9/2009 | Yeh et al. | 200/512 |
| 7,902,473 | B2 * | 3/2011 | Yeh | 200/515 |

* cited by examiner

*Primary Examiner* — Vanessa Girardi
(74) *Attorney, Agent, or Firm* — Thomas|Kayden (57) ABSTRACT

A gas releasable key structure including a base, a thin-film circuit, a key cap and an elastic structure is disclosed. The elastic structure is disposed between the key cap and the thin-film circuit and includes a cap body, a ring-shaped flange, a motion pillar and a conductor. The cap body has a first opening and a second opening. The ring-shaped flange connects an edge around the first opening. The motion pillar in the cap body has a through hole, an upper surface and a lower surface. The through hole is extended to the upper surface from the lower surface, connecting the second opening. The conductor on the lower surface has an indent and a breach that connects the through hole. When the first opening is closed, the gas inside the cap body is dissipated to the exterior via the indent, the breach, the through hole and the second opening.

16 Claims, 6 Drawing Sheets

GAS RELEASABLE KEY STRUCTURE AND KEYBOARD STRUCTURE USING THE SAME

This application claims the benefit of Taiwan application Serial No. 97223204, filed Dec. 24, 2008, the subject matter of which is incorporated herein by reference.

BACKGROUND OF THE INVENTION

1. Field of the Invention

The invention relates in general to a key structure, and more particularly to a gas releasable key structure and a keyboard structure using the same.

2. Description of the Related Art

Examples of electronic devices include mobile phones, PDAs, translation machines, notebook computers, and desktop computers, most using physical keys as the communication interface between the user and the electronic devices. Besides, the virtual keys displayed on the touch screen are getting more and more popular but are used in small-sized hand-held devices to fit the requirements of miniaturization. However, physical keys provide the user with actual tactile feeling, and still amount to a large portion of the peripheral devices such as keyboard of the computer.

According to the design of physical keys, a rubber dome is disposed between the key cap and the circuit board. When the user presses the key cap, the key cap presses the rubber dome and deforms, and further conducts the circuit board to output a signal for operating the key. According to conventional design, most rubber domes are half-hollowed sphere whose opening end is opposite to the circuit board, and directly enclosed by the circuit board. Thus, there is a closed space in the rubber dome, which hinders the user from pressing the key cap easily.

SUMMARY OF THE INVENTION

The invention is directed to a gas releasable key structure and a keyboard structure using the same. A through hole is disposed in the elastic structure within the key structure, so that despite one end of the elastic structure is enclosed, the interior of the elastic structure still can be connected to the external air lest the pressing of the key might be obstructed due to closed space when the elastic structure is in motion.

According to the present invention, a key structure including a base, a thin-film circuit, a key cap and a gas releasable elastic structure is provided. The thin-film circuit is disposed on the base, the key cap is disposed on the thin-film circuit, and the gas releasable elastic structure is disposed between the key cap and the thin-film circuit. The gas releasable elastic structure includes a cap body, a ring-shaped flange, a motion pillar and a conductor. The cap body has a first opening and a second opening opposite to the first opening, wherein the second opening corresponds to the key cap. The ring-shaped flange connects an edge around the first opening of the cap body. The motion pillar is disposed in the cap body, and has a through hole, an upper surface and a lower surface opposite to the upper surface, wherein the upper surface connects the inner wall of the second opening, and the lower surface is opposite to the first opening, and the through hole is extended to the upper surface from the lower surface and connects the second opening. The conductor is disposed on the lower surface of the motion pillar, and has a breach and an indent which are interconnected, wherein the breach corresponds to and interconnects with the through hole. When the first opening is closed, the gas inside the cap body is dissipated to the exterior of the cap body via the indent, the breach, the through hole and the gap between the second opening and the key cap.

According to the present invention, a key structure including a base, a thin-film circuit, a key cap and a gas releasable elastic structure is provided. The thin-film circuit is disposed on the base. The key cap is disposed on the thin-film circuit, and the gas releasable elastic structure is disposed between the key cap and the thin-film circuit. The gas releasable elastic structure includes a cap body, a ring-shaped flange and a motion pillar. The cap body has a first opening and a second opening opposite to the first opening. The ring-shaped flange connects an edge around the first opening of the cap body. The motion pillar is disposed in the cap body, and has a through hole, an outer wall, an upper surface and a lower surface opposite to the upper surface, wherein the outer wall connects the upper surface and the lower surface, the upper surface connects the inner wall of the second opening, and the lower surface is opposite to the first opening. The through hole is located on the outer wall and extended to the upper surface from the lower surface, so that when the first opening is closed, the gas inside the cap body is dissipated to the exterior of the cap body via the through hole and the gap between the second opening and the key cap.

According to the present invention, a keyboard structure including a base, a thin-film circuit and a plurality of key structures is provided. The thin-film circuit is disposed on the base, and each key structure is disposed on the thin-film circuit. Each key structure includes a key cap and a gas releasable elastic structure. The key cap is disposed on the thin-film circuit, and the gas releasable elastic structure is located between the key cap and the thin-film circuit and corresponds to the key cap. The gas releasable elastic structure includes a cap body, a ring-shaped flange, a motion pillar and a conductor. The cap body has a first opening and a second opening opposite to the first opening, wherein the second opening corresponds to the key cap. The ring-shaped flange connects an edge around the first opening of the cap body. The motion pillar is disposed in the cap body, and has a through hole, an upper surface and a lower surface opposite to the upper surface, wherein the upper surface connects the inner wall of the second opening, the lower surface is opposite to the first opening, and the through hole is extended to the upper surface from the lower surface and connects the second opening. The conductor is disposed on the lower surface of the motion pillar, and has a breach and an indent which are interconnected, wherein the breach corresponds to the through hole and connects the through hole. When the first opening is closed, the gas inside the cap body is dissipated to the exterior of the cap body via the indent, the breach, the through hole and the gap between the second opening and the key cap.

According to the present invention, a keyboard structure including a base, a thin-film circuit and a plurality of key structures is provided. The thin-film circuit is disposed on the base, and each key structure is disposed on the thin-film circuit. Each key structure includes a key cap and a gas releasable elastic structure. The key cap is disposed on the thin-film circuit, and the gas releasable elastic structure is located between the key cap and the thin-film circuit, and corresponds to the key cap. The gas releasable elastic structure includes a cap body, a ring-shaped flange and a motion pillar. The cap body has a first opening and a second opening opposite to the first opening. The ring-shaped flange connects an edge around the first opening of the cap body. The motion pillar is disposed in the cap body, and has a through hole, an outer wall, an upper surface and a lower surface opposite to the upper surface, wherein the outer wall connects the upper surface and the lower surface, the upper surface connects the inner wall of the second opening, and the lower surface is opposite to the first opening. The through hole is located on the outer wall and extended to the upper surface from the lower surface, so that when the first opening is closed, the gas inside the cap body is dissipated to the exterior of the cap body via the through hole and the gap between the second opening and the key cap.

The invention will become apparent from the following detailed description of the preferred but non-limiting embodiments. The following description is made with reference to the accompanying drawings.

DETAILED DESCRIPTION OF THE INVENTION

First Embodiment

Figure 1A:
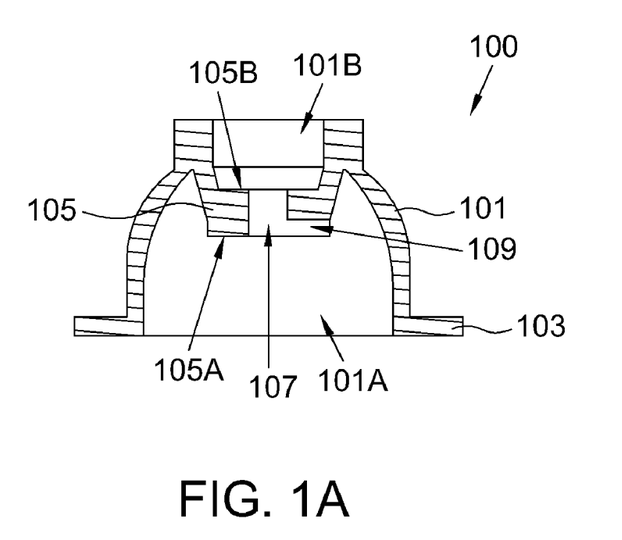
FIG. 1A shows a cross-sectional view of a gas releasable elastic structure according to a first embodiment of the invention.
Figure 1B:
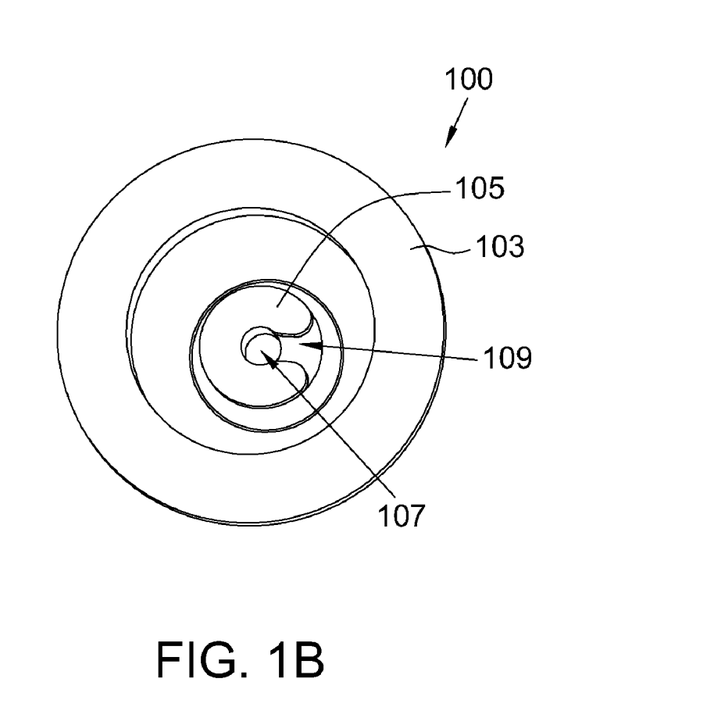
FIG. 1B shows a 3-D diagram of the gas releasable elastic structure of FIG. 1A.

Refer to FIGS. 1A and 1B. FIG. 1A shows a cross-sectional view of a gas releasable elastic structure according to a first embodiment of the invention. FIG. 1B shows a 3-D diagram of the gas releasable elastic structure of FIG. 1A. The gas releasable elastic structure 100 includes a cap body 101, a ring-shaped flange 103 and a motion pillar 105. The cap body 101 has a first opening 101A and a second opening 101B opposite to and smaller than the first opening 101A. Preferably, there is at least one curve in the contour between the first opening 101A and the second opening 101B of the cap body 101.

The ring-shaped flange 103 connects an edge around the first opening 101A of the cap body 101 for pressing an object (not illustrated) to support the entire gas releasable elastic structure 100. The motion pillar 105 is disposed in the cap body 101, and has a through hole 107, a lower surface 105A and an upper surface 105B opposite to the lower surface 105A, wherein the upper surface 105B connects the inner wall of the second opening 101B, and the lower surface 105A is opposite to the first opening 101A, the through hole 107 is extended to the upper surface 105B from the lower surface 105A, and interconnects with the second opening 101B. The lower surface 105A of the motion pillar 105 has an indent 109 connecting the through hole 107. When the first opening 101A is closed, the gas inside the cap body 101 is dissipated to the exterior of the cap body 101 via the indent 109, the through hole 107 and the second opening 101B.

Preferably, the cap body 101, the ring-shaped flange 103 and the motion pillar 105 of the gas releasable elastic structure 100 are integrally formed in one piece. Also, the gas releasable elastic structure 100 can be made from elastic materials such as rubber and plastics.

Figure 2:
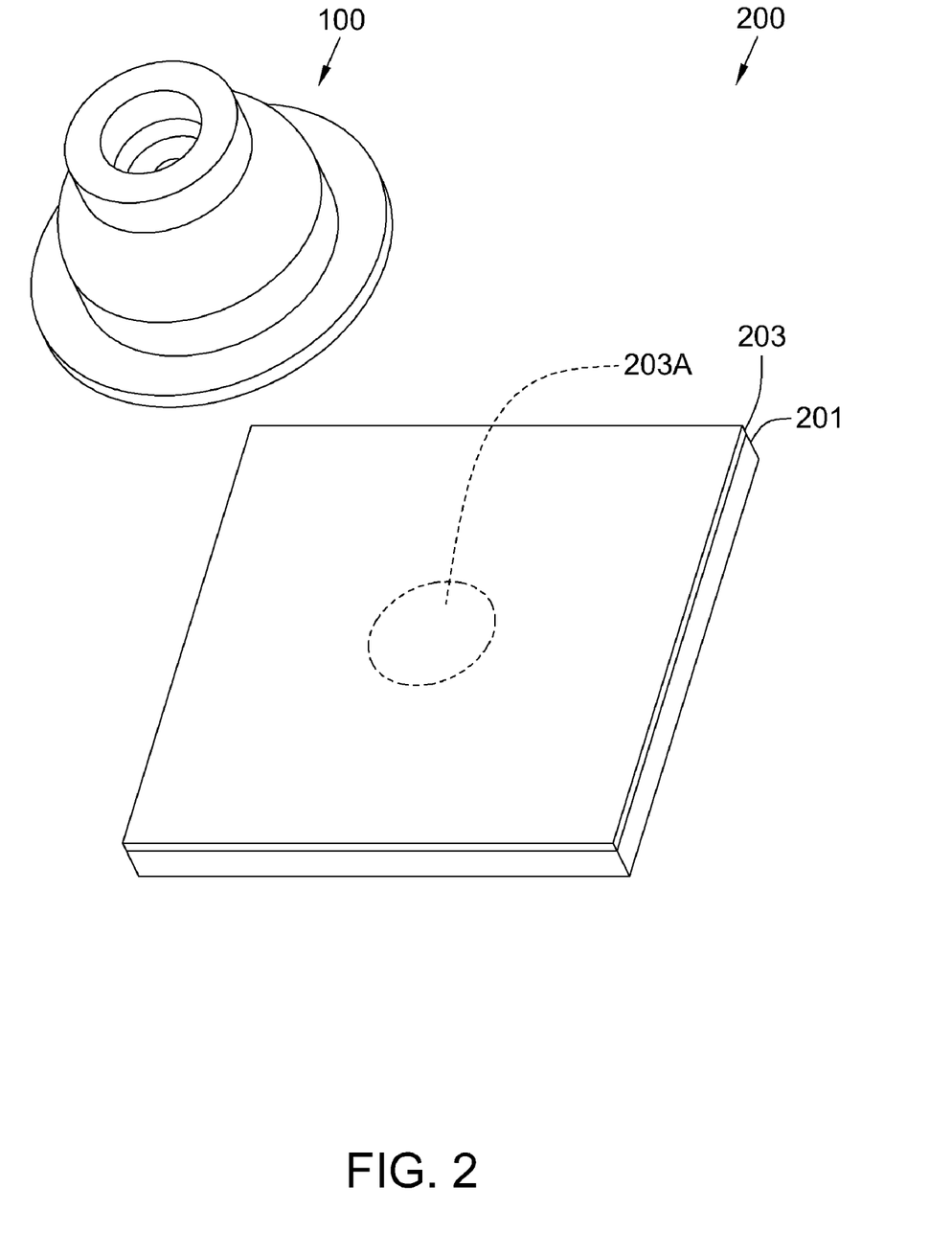
FIG. 2 shows the gas releasable elastic structure of FIG. 1A corresponding to a thin-film circuit.
Figure 3A:
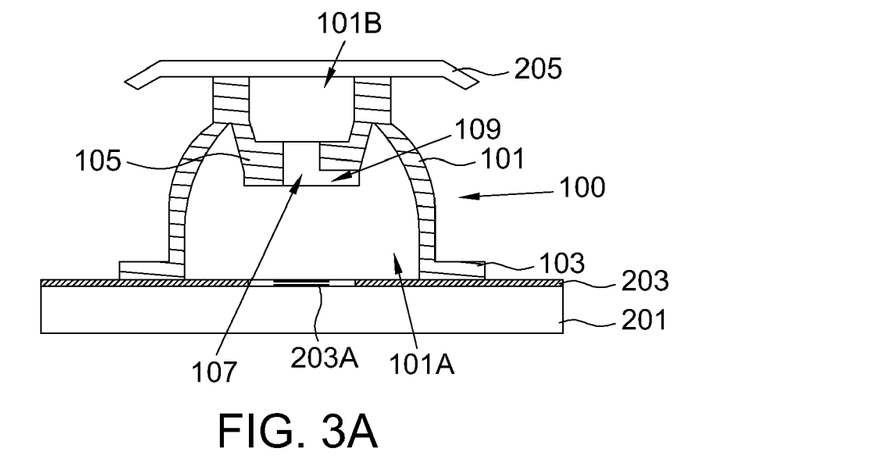
FIG. 3A and FIG. 3B show a keyboard structure having the gas releasable elastic structure of FIG. 1A before and after motion.
Figure 3B:
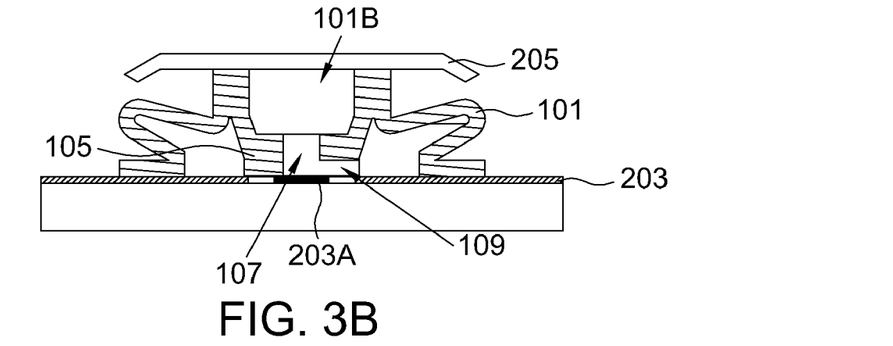

Next, refer to FIGS. 2, 3A, 3B. FIG. 2 shows the gas releasable elastic structure of FIG. 1A corresponding to a thin-film circuit. FIG. 3A and FIG. 3B show a keyboard structure having the gas releasable elastic structure of FIG. 1A before and after motion. The keyboard structure 200 includes a base 201, a thin-film circuit 203 and a plurality of key structures, wherein the thin-film circuit 203 is disposed on the base 201, and the key structures are disposed on the thin-film circuit 203. For simplification purpose, only one key structure is illustrated in FIGS. 2, 3A. As indicated in FIG. 3A, the key structure includes a key cap 205 and a gas releasable elastic structure 100. The key cap 205 is disposed above the thin-film circuit 203, and the gas releasable elastic structure 100 is disposed between the thin-film circuit 203 and the key cap 205. The ring-shaped flange 103 of the gas releasable elastic structure 100 presses the thin-film circuit 203, and the key cap 205 presses the second opening 101B of the cap body 101.

The thin-film circuit 203 can be a single-layered thin-film circuit or a multi-layered thin-film circuit. Let the multi-layered thin-film circuit be taken for example. As indicated in FIG. 3A, the contact point 203A of the key switch is composed by two conductive layers and an insulation layer, wherein the insulation layer is interposed between two conductive layers to maintain the electrical insulation between the conductive layers.

As indicated in FIG. 3B, when the key cap 205 is pressed downward, the motion pillar 105 is moved towards the thin-film circuit 203 and contacts the contact point 203A, so that the conductive layers of the contact point 203A are conducted to generate a key signal. The space inside the cap body 101 is connected to the exterior via the indent 109, the through hole 107 and the gap between the second opening 101B and the key cap 205. Thus, no closed space will be formed in the cap body 101. Thus, during the process of pressing the key cap 205, the key cap 205 can be easily pressed. When the key cap 205 is released, the cap body 101 can be easily resumed through its own elasticity.

Figure 4:
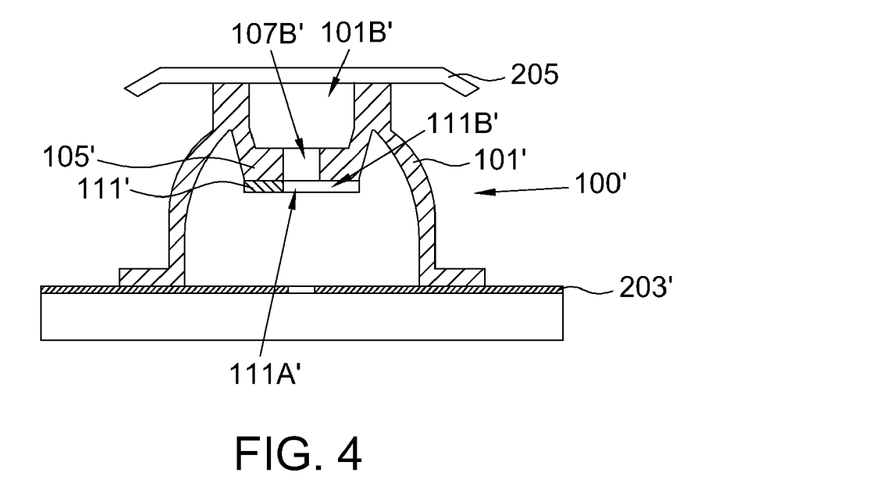
FIG. 4 shows a gas releasable elastic structure of the first embodiment with a conductor.
Figure 5:
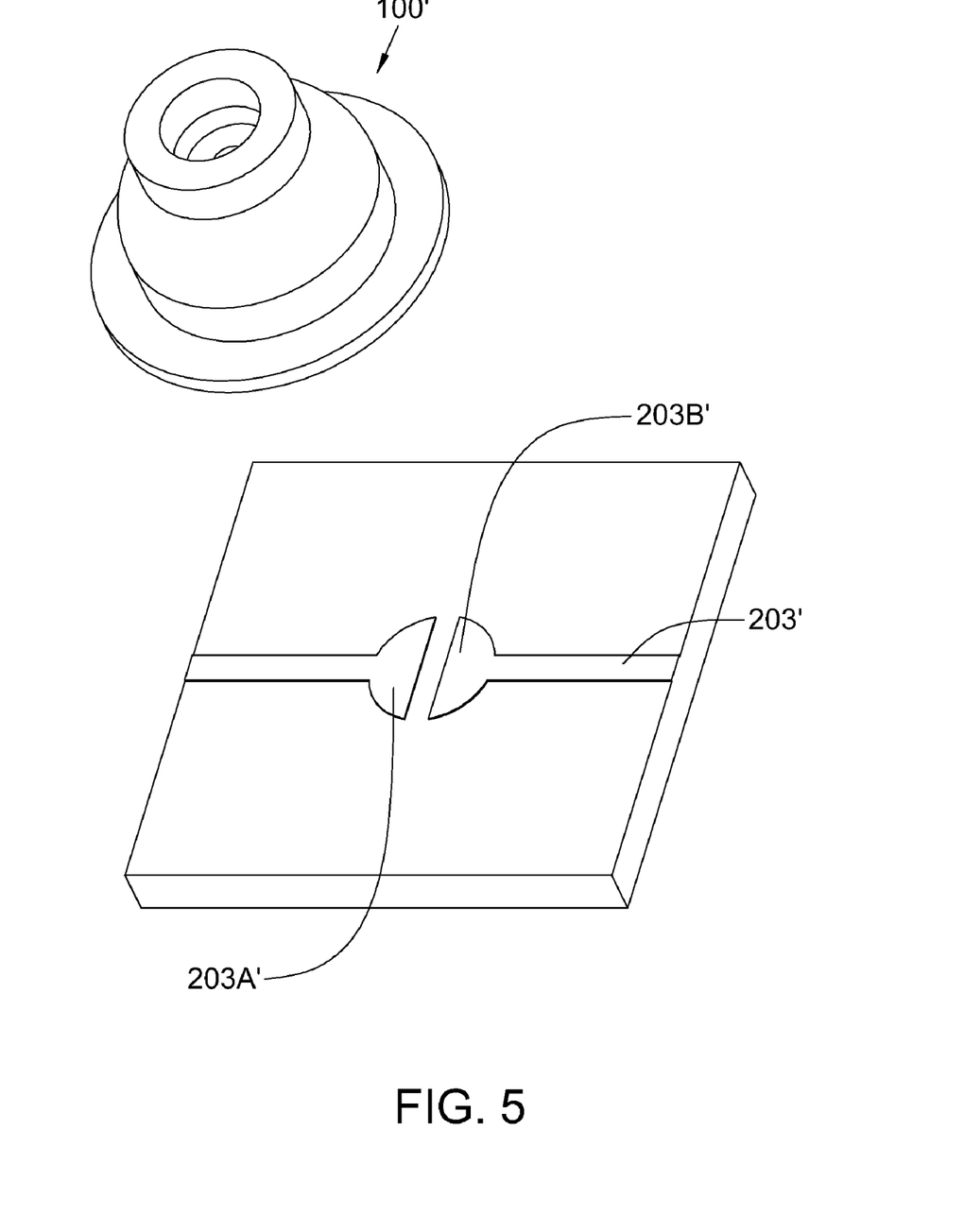
FIG. 5 shows the gas releasable elastic structure of FIG. 4 corresponding to a thin-film circuit.

Refer to FIG. 4 and FIG. 5. FIG. 4 shows a gas releasable elastic structure of the first embodiment with a conductor. FIG. 5 shows the gas releasable elastic structure of FIG. 4 corresponding to a thin-film circuit. The thin-film circuit 203' is a single-layered thin-film circuit for example. As indicated in FIG. 5, the gas releasable elastic structure 100' corresponds to a key switch of the thin-film circuit 203', wherein the key switch is composed by two contact points 203A' and 203B' being separated from each other. As the contact points 203A' and 203B' need to be conducted to generate a key signal, preferably, an extra conductor is disposed in the gas releasable elastic structure. The contour of the conductor is preferably similar to the contour of the bottom of the motion pillar 105 of FIG. 1B. The conductor is made from metal or ink.

As indicated in FIG. 4, the conductor 111' of the gas releasable elastic structure 100' is disposed on the lower surface of the motion pillar 105'. When the key cap 205 is pressed, the conductor 111' moves downward and at the same time contacts the contact point 203A', 203B', so that the contact points 203A' and 203B' are conducted to generate a key signal. The conductor 111' can be formed on the lower surface of the motion pillar 105' by printing or pasting.

Preferably, the contour of the conductor 111' and the contour of the lower surface of the motion pillar 105' are substantially the same, and the conductor 111' has a breach 111A' and an indent 111B' which are interconnected, wherein the breach 111A' corresponds to and interconnects with the through hole 107'. Thus, despite one side of the cap body 101' enclosed by the thin-film circuit 203', the gas inside the cap body 101' still can be dissipated to the exterior of the cap body 101 via the indent 111B', the breach 111A', the through hole 107' and the gap between the second opening 101B' and the key cap 205.

Second Embodiment

Figure 6A:
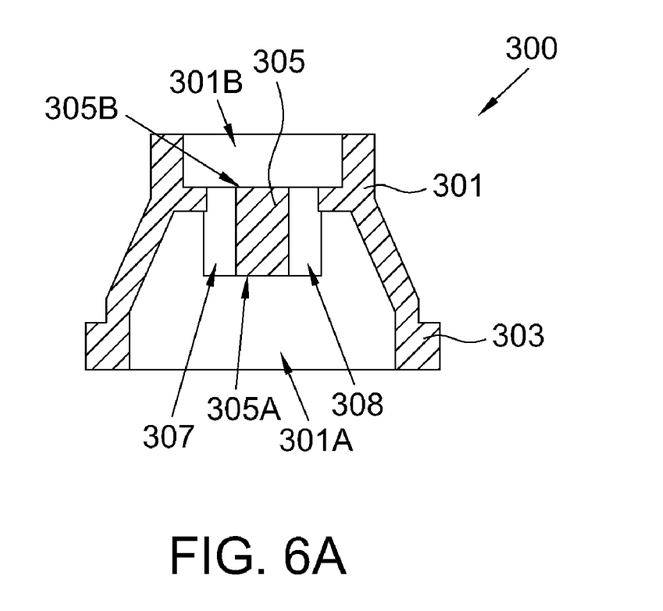
FIG. 6A shows a cross-sectional view of a gas releasable elastic structure according to a second embodiment of the invention.
Figure 6B:
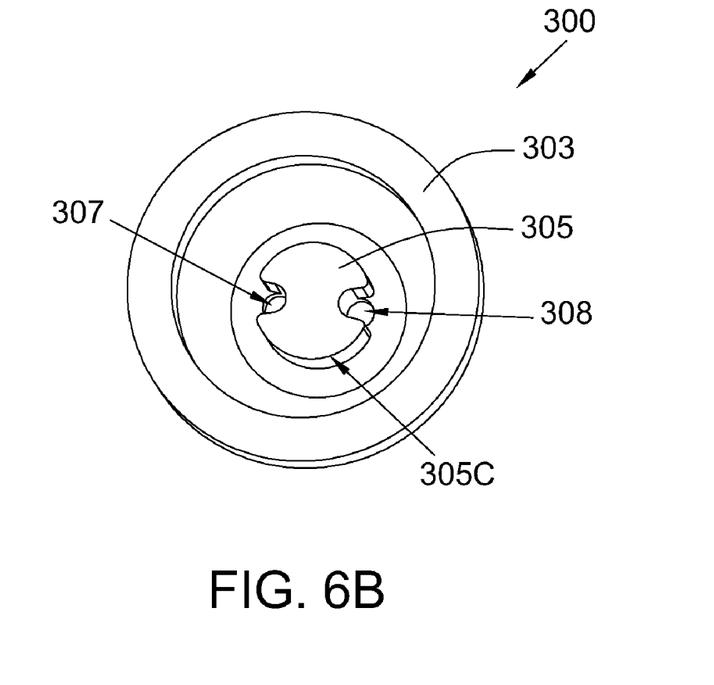
FIG. 6B shows a 3-D diagram of the gas releasable elastic structure of FIG. 6A.

The present embodiment of the invention further provides a gas releasable elastic structure, which differs from the elastic structure of the first embodiment in the design of the motion pillar and is exemplified below. Refer to FIG. 6A and FIG. 6B. FIG. 6A shows a cross-sectional view of a gas releasable elastic structure according to a second embodiment of the invention. FIG. 6B shows a 3-D diagram of the gas releasable elastic structure of FIG. 6A. The gas releasable elastic structure 300 includes a cap body 301, a ring-shaped flange 303 and a motion pillar 305. The cap body 301 has a first opening 301A and a second opening 301B smaller than the first opening 301A. The ring-shaped flange 303 connects an edge around the first opening 301A of the cap body 301.

The motion pillar 305 is disposed in the cap body 301, and has at least one through hole, a lower surface 305A and an upper surface 305B opposite to the lower surface 305A. The motion pillar 305 further has an outer wall 305C (referring to FIG. 6B) connecting the lower surface 305A and the upper surface 305B. The upper surface 305B connects the inner wall of the second opening 301B. The lower surface 305A is opposite to the first opening 301A. In the present embodiment of the invention, the motion pillar 305 has two through holes 307 and 308 disposed on the outer wall, for example. The through holes 307 and 308 respectively are extended towards the upper surface 305B from the lower surface 305A, and preferably are separated by about 180 degrees. When the first opening 301A is closed, the gas inside the cap body 301 is dissipated to the exterior of the cap body 301 via the through holes 307 and 308 and the second opening 301B.

Figure 7:
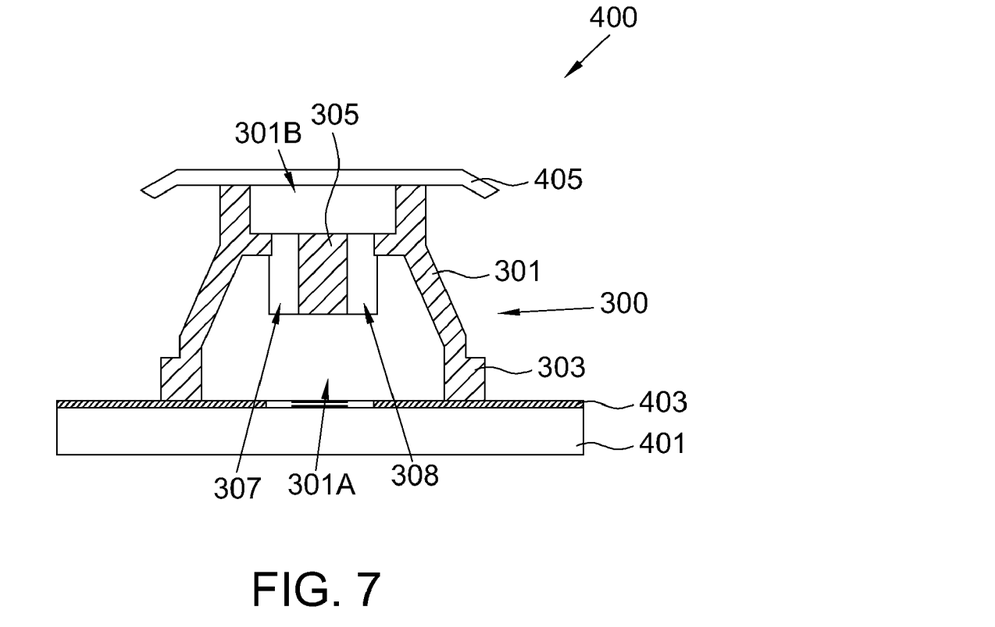
FIG. 7 shows a keyboard structure having the gas releasable elastic structure of FIG. 6A.

In the present embodiment of the invention, the gas releasable elastic structure 300 can be used in the keyboard structure. Referring to FIG. 7, a keyboard structure having the gas releasable elastic structure of FIG. 6A is shown. The keyboard structure 400 includes a base 401, a thin-film circuit 403 and a plurality of key structures, wherein the thin-film circuit 403 is disposed on the base 401, and the key structure is disposed on the thin-film circuit 403. Only one key structure is shown in FIG. 7 for simplicity.

As indicated in FIG. 7, the key structure includes a key cap 405 and a gas releasable elastic structure 300. The key cap 405 is disposed on the thin-film circuit 403, and the gas releasable elastic structure 300 is disposed between the thin-film circuit 403 and the key cap 405. The ring-shaped flange 303 of the gas releasable elastic structure 300 presses the thin-film circuit 403, and the key cap 405 presses the second opening 301B of the cap body 301. In the present embodiment of the invention, the thin-film circuit 403 is a multi-layered thin-film circuit for example.

No matter the key cap 405 is pressed or released, the space inside the cap body 301 is always connected to the exterior via the through holes 307 and 308 and the gap between the second opening 101B and the key cap 405. Thus, no closed space will be formed in the cap body 101, so that during the process of pressing the key cap 405, the key cap 405 can be easily pressed. When releasing the key cap 405, the cap body 301 can be easily resumed through its own elasticity.

Figure 8:
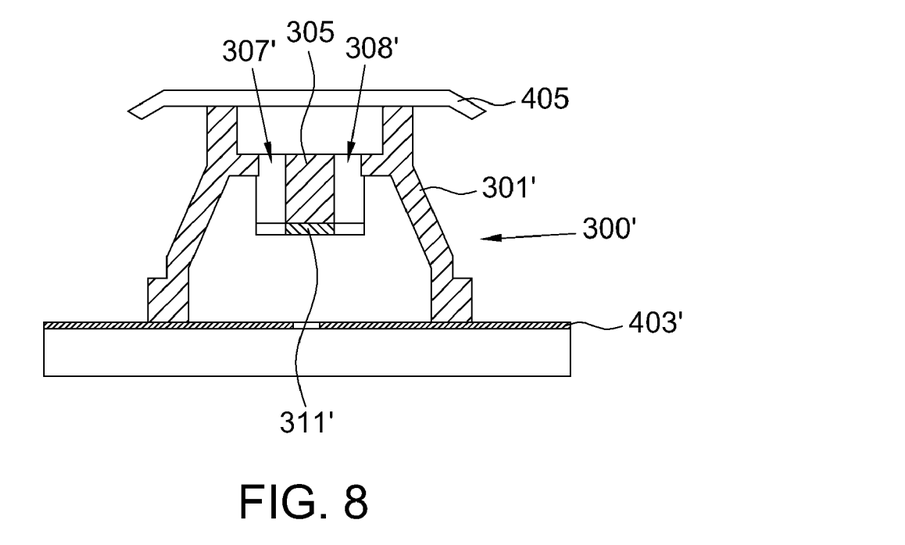
FIG. 8 shows a gas releasable elastic structure of the second embodiment with a conductor.

Referring to FIG. 8, a gas releasable elastic structure of the second embodiment with a conductor is shown. The thin-film circuit 403' of FIG. 8 is a single-layered thin-film circuit for example. The conductor 311' of the gas releasable elastic structure 300' is disposed on the lower surface of the motion pillar 305', and preferably, the contour of the conductor 311' is similar to the contour of the bottom of the motion pillar 305 of FIG. 6B. When the key cap 405 is pressed, the conductor 311' moves downwards and at the same time contacts the thin-film circuit 403', so that the contact points (not illustrated) on the thin-film circuit 403' are conducted to generate a key signal.

During the process of pressing the key cap 405, despite one side of the cap body 301' enclosed by the thin-film circuit 403', the gas inside the cap body 301' still can be dissipated to the exterior of the cap body 301' via the two through holes 307' and 308' and the gap between the second opening 301B' and the key cap 405.

According to the gas releasable elastic structure and the key structure and the keyboard structure using the same are disclosed in the above embodiments of the invention, a through hole is disposed on the gas releasable elastic structure and used for dissipating the air, so that when one end of the elastic structure near the thin-film circuit is enclosed, the interior space of the elastic structure is still connected to the external, and no closed space will be formed. Thus, when the elastic structure is in motion, the key still can be pressed smoothly and provides excellent tactile feeling to the user for no closed space is formed. Besides, a conductor can be disposed in the gas releasable elastic structure to fit different designs of the thin-film circuit. Thus, the gas releasable elastic structure disclosed in the embodiments of the invention has a wider range of application than conventional design.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A key structure, comprising:
   a base;
   a thin-film circuit disposed on the base;
   a key cap disposed on the thin-film circuit; and
   a gas releasable elastic structure disposed between the key cap and the thin-film circuit, and comprising:
      a cap body having a first opening and a second opening opposite to and smaller than the first opening, wherein the second opening corresponds to the key cap;
      a ring-shaped flange connecting an edge around the first opening of the cap body;
      a motion pillar disposed in the cap body and having a through hole, an upper surface and a lower surface opposite to the upper surface, wherein the upper surface connects the inner wall of the second opening, the lower surface is opposite to the first opening, and the through hole is extended to the upper surface from the lower surface and connects the second opening; and
      a conductor disposed on the lower surface and having a breach and an indent which are interconnected, wherein the breach corresponds to and interconnects with the through hole, so that when the first opening is closed, the gas inside the cap body is dissipated to the exterior of the cap body via the indent, the breach, the through hole and a gap between the second opening and the key cap.

2. The key structure according to claim 1, wherein the contour of the conductor and the contour of the lower surface are substantially the same.

3. The key structure according to claim 1, wherein there is at least one curve in the contour between the first opening and the second opening of the cap body.

4. A key structure, comprising:
a base;
a thin-film circuit disposed on the base;
a key cap disposed on the thin-film circuit; and
a gas releasable elastic structure disposed between the key cap and the thin-film circuit, and comprising:
 a cap body having a first opening and a second opening opposite to and smaller than the first opening;
 a ring-shaped flange connecting an edge around the first opening of the cap body;
 a motion pillar disposed in the cap body and having a first through hole, an outer wall, an upper surface and a lower surface opposite to the upper surface, wherein the outer wall connects the upper surface and the lower surface, the upper surface connects the inner wall of the second opening, the lower surface is opposite to the first opening, and the first through hole is located on the outer wall and extended to the upper surface from the lower surface so that when the first opening is closed, the gas inside the cap body is dissipated to the exterior of the cap body via the first through hole and a gap between the second opening and the key cap.

5. The key structure according to claim 4, wherein the motion pillar further has a second through hole located on the outer wall and extended to the upper surface from the lower surface, and the first through hole and the second through hole are separated by about 180 degrees.

6. The key structure according to claim 5, wherein the lower surface of the motion pillar has a conductor, and the contour of the conductor and the contour of the lower surface are substantially the same.

7. The key structure according to claim 4, wherein there is at least one curve in the contour between the first opening and the second opening of the cap body.

8. A keyboard structure, comprising:
a base;
a thin-film circuit disposed on the base; and
a plurality of key structures disposed on the thin-film circuit, wherein the key structures respectively comprise:
 a key cap disposed on the thin-film circuit; and
 a gas releasable elastic structure disposed between the thin-film circuit and the key cap, and comprising:
  a cap body having a first opening and a second opening opposite to and smaller than the first opening, wherein the first opening corresponds to the thin-film circuit, and the second opening corresponds to the key cap;
  a ring-shaped flange connecting an edge around the first opening of the cap body, and pressing the thin-film circuit;
  a motion pillar disposed in the cap body and having a through hole, an upper surface and a lower surface opposite to the upper surface, wherein the upper surface connects the inner wall of the second opening, the lower surface is opposite to the first opening, and the through hole is extended to the upper surface from the lower surface and connects the second opening; and
  a conductor disposed on the lower surface and having a breach and an indent which are interconnected, wherein the breach corresponds to and interconnects with the through hole, so that when the key cap is pressed, the gas inside the cap body is dissipated to the exterior of the cap body via the indent, the breach, the through hole and a gap between the second opening and the key cap.

9. The keyboard structure according to claim 8, wherein the contour of the conductor and the contour of the lower surface are substantially the same.

10. The keyboard structure according to claim 8, wherein there is curve in the contour between the first opening and the second opening of the cap body.

11. The keyboard structure according to claim 8, wherein the thin-film circuit is a single-layered thin-film circuit or a multi-layered thin-film circuit.

12. A keyboard structure, comprising:
a base;
a thin-film circuit disposed on the base; and
a plurality of key structures disposed on the thin-film circuit, wherein the key structures respectively comprise:
 a key cap disposed on the thin-film circuit; and
 a gas releasable elastic structure disposed between the thin-film circuit and the key cap, and comprising:
  a cap body having a first opening and a second opening opposite to and smaller than the first opening;
  a ring-shaped flange connecting an edge around the first opening of the cap body; and
  a motion pillar disposed in the cap body and having a first through hole, an outer wall, an upper surface and a lower surface opposite to the upper surface, wherein the outer wall connects the upper surface and the lower surface, the upper surface connects the inner wall of the second opening, the lower surface is opposite to the first opening, and the first through hole is located on the outer wall and extended to the upper surface from the lower surface, so that when the first opening is closed, the gas inside the cap body is dissipated to the exterior of the cap body via the first through hole and a gap between the second opening and the key cap.

13. The keyboard structure according to claim 12, wherein the motion pillar further has a second through hole located on the outer wall and extended to the upper surface from the lower surface, and the first through hole and the second through hole are separated by about 180 degrees.

14. The keyboard structure according to claim 13, wherein the lower surface of the motion pillar has a conductor, and the contour of the conductor and the contour of the lower surface are substantially the same.

15. The keyboard structure according to claim 12, wherein there is at least one curve in the contour between the first opening and the second opening of the cap body.

16. The keyboard structure according to claim 12, wherein the thin-film circuit is a single-layered thin-film circuit or a multi-layered thin-film circuit.

* * * * *